Figure 1:
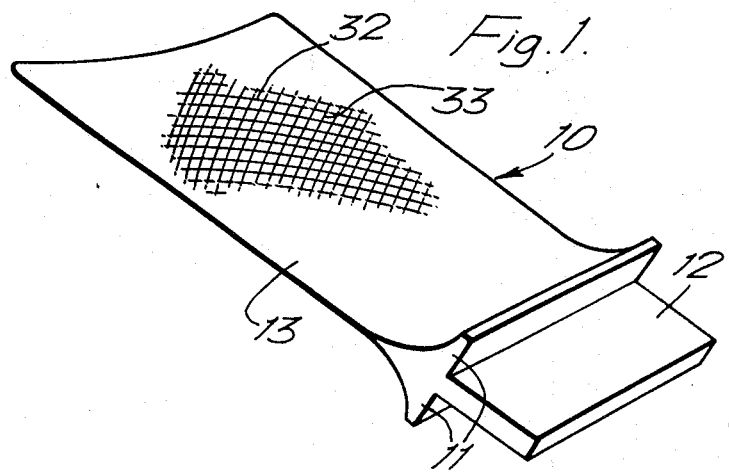

United States Patent

[11] 3,619,448

| [72] | Inventors | Jack Palfreyman<br>Matlock, Derby;<br>Henry Edward Middleton, Derby, both of England |
|---|---|---|
| [21] | Appl. No. | 822,259 |
| [22] | Filed | May 6, 1969 |
| [45] | Patented | Nov. 9, 1971 |
| [73] | Assignee | Rolls-Royce Limited<br>Derby, England |
| [32] | Priority | May 10, 1968 |
| [33] | | Great Britain |
| [31] | | 22,298/68 |

[54] METHOD OF MAKING AN AEROFOIL-SHAPED BLADE
12 Claims, 5 Drawing Figs.

[52] U.S. Cl. .................................................... 264/103, 264/261, 264/317, 264/321
[51] Int. Cl. .................................................... B29d 9/06, B29c 27/26
[50] Field of Search .......................................... 264/261, 113, 258, 317, 103

[56] References Cited
UNITED STATES PATENTS

| 2,879,196 | 3/1959 | Brucker | 264/317 X |
| 2,929,755 | 3/1960 | Porter | 264/258 X |
| 2,937,805 | 5/1960 | Warnken | 264/261 X |
| 3,215,762 | 11/1965 | Phelps | 264/258 X |
| 3,263,289 | 8/1966 | LaGarde | 264/X |
| 3,349,157 | 10/1967 | Parsons | 264/258 X |
| 3,518,338 | 6/1970 | Tambussi | 264/317 X |

Primary Examiner—Robert F. White
Assistant Examiner—Richard R. Kucia
Attorney—Cushman, Darby & Cushman ABSTRACT: A method of making an aerofoil-shaped blade comprising positioning a pair of laminar members to provide a gap therebetween, the opposite sides of the blade profile being respectively provided on the said laminar members, thereafter winding fibrous material through the said gap, in a longitudinal direction with respect to the blade being formed and forming the assembly of laminar members and fibrous material into an aerofoil-shaped blade.

PATENTED NOV 9 1971

3,619,448

SHEET 1 OF 2

INVENTORS
JACK PALFREYMAN
HENRY EDWARD MIDDLETON

BY
Cushman, Darby & Cushman
ATTORNEYS

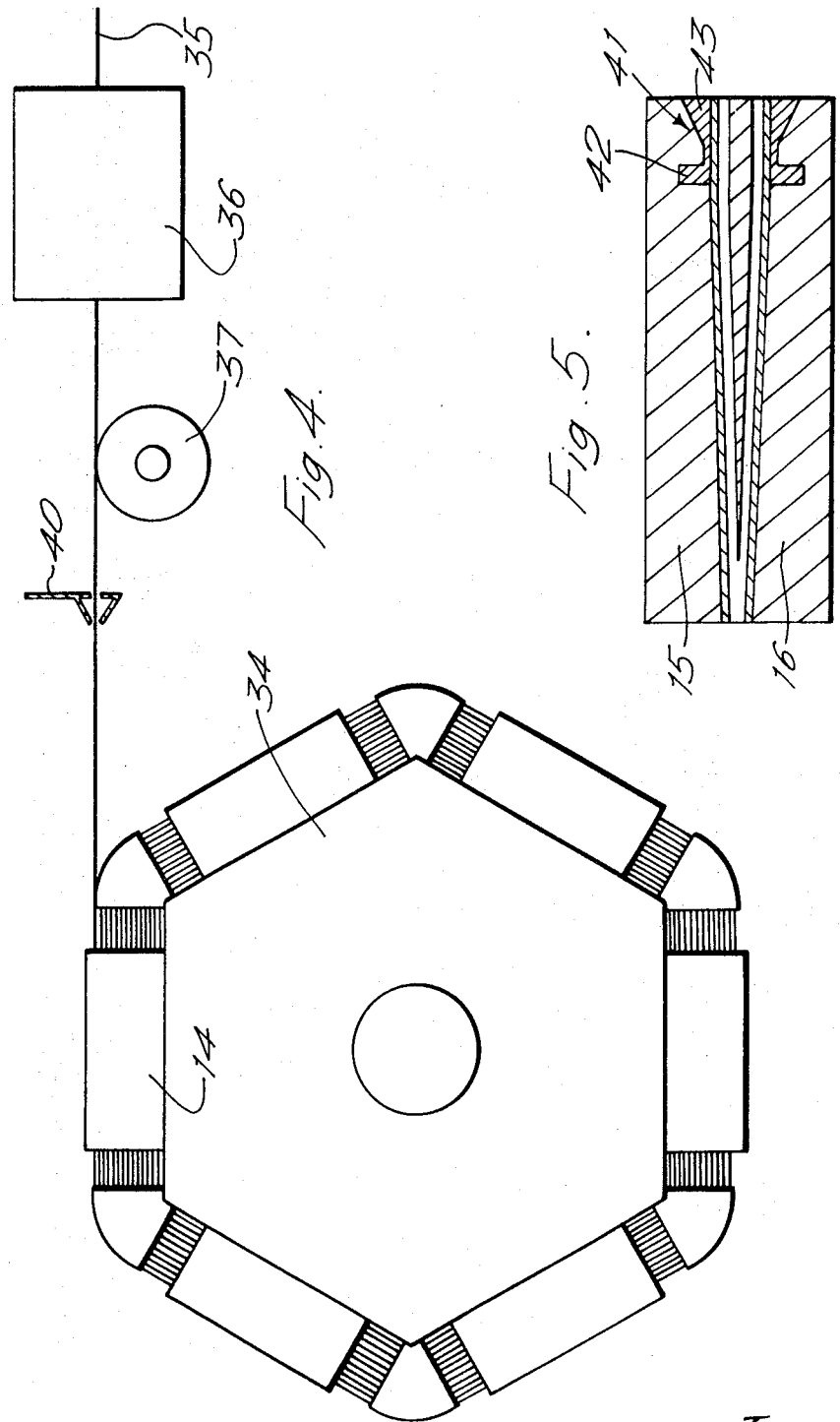

METHOD OF MAKING AN AEROFOIL-SHAPED BLADE

This invention concerns a method making an aerofoil-shaped blade such, for example, as a compressor rotor blade of a gas turbine engine.

According to the present invention, there is provided a method of making an aerofoil-shaped blade comprising positioning between portions of the mould a pair of laminar members to provide a gap therebetween, the opposite sides of the blade profile being respectively provided on the said laminar members, thereafter winding fibrous material a plurality of times longitudinally through the gap, and forming in the mould the assembly of laminar members and fibrous material into an aerofoil-shaped blade.

Each of the said laminar members is preferably reinforced with fibrous material. Thus the fibers in each of the said laminar members may be cross-woven. Moreover, each of the laminar members may initially be moulded on a former, and may thereafter be wound with the fibrous material.

A filler member may be permanently or temporarily positioned in the gap. Thus the filler member may be meltable and, after being initially positioned in the gap, may be subsequently removed by melting it out.

Alternatively, the filler member may be permanently retained in the gap and may comprise a honeycomb or foamed member.

Alternatively, or additionally, the fibrous material may be impregnated with a resin, the resin impregnation bonding the laminar members together.

A plurality of pairs of laminar members may be mounted on a common rotary member so that the gaps of the said pairs are aligned, fibrous material being wound into the aligned gaps.

Preferably parts corresponding to platform and/or root portions of the blade are bonded to the remaining part of the blade during the said forming of the latter.

The fibrous material may be carboniferous material or may be a metal coated fiber, while the laminar members may be made either of metal or of a plastics material such as an epoxy resin.

The invention also comprises an aerofoil-shaped blade when made by the method set forth above.

Figure 2:
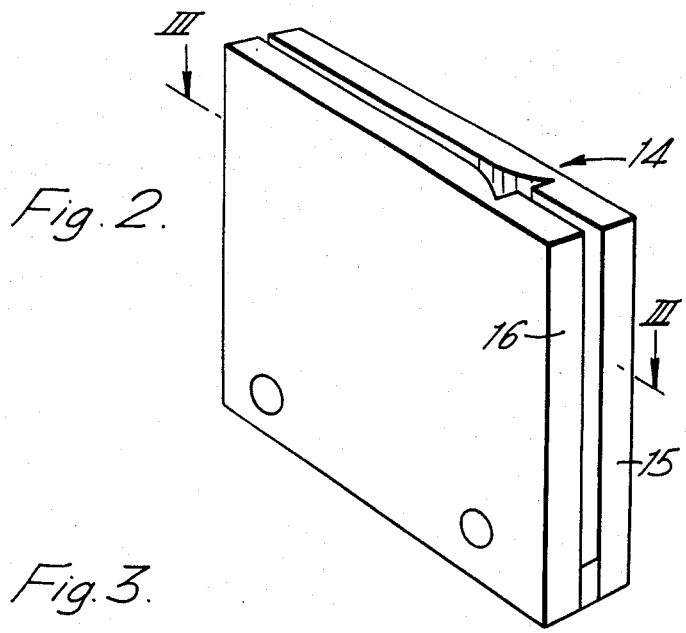
Figure 3:
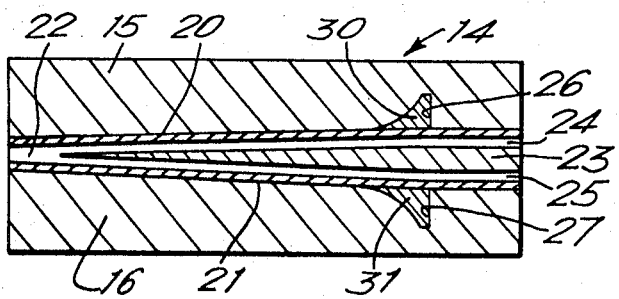

The invention is illustrated, merely by way of example in the accompanying drawings, in which:

FIG. 1 is a diagrammatic perspective view of an aerofoil-shaped blade formed by the method of the present invention, FIG. 2 is a diagrammatic view of a mould or of a holding device in which the blade of FIG. 1 may be formed, FIG. 3 is a diagrammatic sectional view taken on the line 3—3 of FIG. 2, and showing parts of the blade assembled in the mould or holding device.

FIG. 4 diagrammatically illustrates the formation of a plurality of blades each of which is constituted by the assembly shown in FIG. 3, and FIG. 5 is a view similar to FIG. 3 but illustrating a modification.

In FIG. 1 there is shown an aerofoil-shaped compressor rotor blade 10 of a gas turbine engine, the blade 10 having circumferentially extending platform parts 11, a root 12 and a blade profile 13.

The blade shown in FIG. 1 is formed in a mould 14 (FIGS. 2 and 3) having mould parts 15, 16. The blade is formed from a pair of laminar members 20, 21 (see FIG. 3) which are mounted in the mould 14 so as to provide a gap 22 therebetween. Mounted in the gap 22 is a meltable filler member 23, e.g. of wax, which is spaced from the laminar members 20, 21 by spaces 24, 25 respectively.

The mould parts 15, 16 are provided with recesses 26, 27 which are substantially triangular in section and in which there are respectively disposed correspondingly shaped parts 30, 31 which will ultimately be moulded to the remainder of the blade so as to form the platform parts 11.

The laminar members 20, 21 may be formed of metal but are preferably formed of an epoxy or other synthetic resin which has been fiber reinforced. The fiber reinforcement may be of metal coated fiber, but is preferably of a carboniferous fiber formed from polyacrylonitrile.

Each of the laminar members 20, 21 may, for example, be initially moulded on a former (not shown) and may thereafter be wound with the carboniferous or other fibrous material, e.g. in such a way as to achieve the cross-woven pattern shown in FIG. 1. This may be effected by winding one set of fibers 32 onto one side of the laminar member, reversing the laminar member and winding the other set 33 of fibers at an angle of approximately 90° to the first set.

A plurality of assemblies as shown in FIG. 3 are mounted as shown in FIG. 4, on a common rotary member 34 of hexagonal shape in such a way that the gaps 22 of these assemblies are aligned. A length of polyacrylonitrile fiber 35 is passed through a furnace 36 in which the fiber is subjected to a heat treatment which graphitises the fiber so as to render it very strong. The fiber then passes over a roller 37 and through a drip-feed unit 40 which impregnates the fiber with a synthetic resin. The impregnated fiber is then wound longitudinally and successively through the various aligned gaps 22 until the latter are filled, the resin impregnation bonding the laminar members and the other parts of each said assembly together.

The fibers extending between the various moulds 14 on the rotary member 34 are then cut away, and the components in each mould 14 are moulded.

As a result, the laminar members 20, 21, the fibers 35, and the parts 30, 31 are all bonded to each other and form an aerofoil-shaped blade 10, the laminar members 20, 21 providing the opposite sides of the blade profile 13. In the course of this moulding the meltable filler member 23 is removed by melting it out.

Alternatively, the moulds 14 may be replaced by holding devices of similar construction, the resin impregnation being relied on to effect the necessary bonding together of the various parts of the blade.

Alternatively, the meltable filler member 23 could be replaced by a honeycomb or foamed member (not shown) which remains within the blade 10 after the latter has been finally formed.

If desired, the root portion 12 may either be slotted after the blade has been formed, so as to provide it with a series of tangs, or such tangs may be moulded into the root portion 12 ab initio.

Alternatively, the root portion 12 could be dovetailed. Thus, as shown in FIG. 5, the parts 30 shown in FIG. 3 could be replaced by parts 41, each of which has a platform portion 42 and a wedge-shaped root portion 43.

The particular arrangement of the fibers 32, 33 in the blade 10 will depend upon the loads to which the blade 10 is expected to be subjected. Thus, it may, for example, only be necessary to provide one of the sets of fibers 32, 33.

As will be appreciated, the fibers 35 in the blade will extend longitudinally therethrough right down to the root portion 12 and will thus be well adapted to carry the loads to which the blade will be subjected.

If desired, the leading and trailing edges of the blade may be reinforced with fibers.

We claim:

1. A method of making an aerofoil-shaped blade comprising the steps of:

positioning a pair of laminar members, each having a side generally shaped to form part of the blade profile, between portions of a mould with a gap extending between the members and with said blade profile shaped sides being oppositely disposed away from the gap; thereafter winding fibrous material a plurality of times longitudinally through the entire length of the gap in a manner such that the fibrous material will extend longitudinally of the formed blade; and then forming in the mould, the assembly of laminar members and fibrous material, as a unitary structure into the aerofoil-shaped blade.

2. A method as claimed in claim 1 including reinforcing the laminar members with a fibrous material prior to positioning of the laminar members between the portions of the mould.

3. A method as claimed in claim 2 in which the reinforcing of the laminar members with the fibrous material is accomplished by cross-weaving the fibrous material.

4. A method as claimed in claim 2 including initially moulding the laminar members on a former and thereafter reinforcing the laminar members by winding the same with the fibrous material.

5. A method as claimed in claim 1 including temporarily positioning a meltable filler member in the gap in spaced relationship with both of said laminar members.

6. A method as claimed in claim 5 including removing the filler member by melting the same after the aerofoil-shaped blade has been formed.

7. A method as claimed in claim 1 including positioning a honeycomb filler member in the gap in spaced relationship with both of said laminar members and permanently retaining the filler member in position by the forming of the aerofoil-shaped blade.

8. A method as claimed in claim 1 in which the fibrous material is impregnated with a resin, the resin impregnation bonding the laminar members together.

9. A method as claimed in claim 1 including positioning a plurality of pairs of laminar members on a common rotary member with the gaps of said pairs being aligned, and winding the fibrous material longitudinally and successively through the aligned gaps until the gaps are filled.

10. A method as claimed in claim 1 including mounting parts corresponding to platform and root portions of the blade in the mould prior to moulding and bonding these parts to the remaining part of the blade during the forming of the blade.

11. A method as claimed in claim 1 in which the fibrous material is carboniferous material.

12. A method as claimed in claim 1 including positioning a foamed member in the gap in spaced relationship to both of said laminar members and permanently retaining the foamed member in position by the forming of the aerofoil-shaped blade.

* * * * *